(12) United States Patent
Rohr et al.

(10) Patent No.: US 9,215,432 B1
(45) Date of Patent: Dec. 15, 2015

(54) SYSTEMS AND METHODS FOR CALIBRATING AND ALIGNING DISPLAYS

(75) Inventors: Michael V. Rohr, Fenton, MO (US);
Eric C. Fesenmaier, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 13/162,320

(22) Filed: Jun. 16, 2011

(51) Int. Cl.
*G03B 21/20* (2006.01)
*H04N 9/31* (2006.01)

(52) U.S. Cl.
CPC .................................. *H04N 9/3194* (2013.01)

(58) Field of Classification Search
CPC .... H04N 9/3194; G03B 21/147; G03B 21/10; G03B 21/28; G03B 17/54
USPC ....................................... 353/69, 70; 348/745
See application file for complete search history.

(56) References Cited

U.S. PATENT DOCUMENTS

| | | | |
|---|---|---|---|
| 7,365,720 B2 | 4/2008 | Bouwens et al. | |
| 7,445,344 B2 | 11/2008 | Lang et al. | |
| 2001/0015793 A1* | 8/2001 | Fujita et al. | 353/74 |
| 2004/0130668 A1* | 7/2004 | Greve et al. | 348/739 |
| 2004/0150835 A1* | 8/2004 | Frick et al. | 356/601 |
| 2006/0170880 A1 | 8/2006 | Dambach et al. | |
| 2007/0171646 A1* | 7/2007 | Kojima | 362/268 |
| 2008/0309884 A1* | 12/2008 | O'Dor et al. | 353/7 |
| 2009/0207383 A1* | 8/2009 | Hirahara et al. | 353/69 |

OTHER PUBLICATIONS

Christie Introduces Latest Advancement to Automatically Color Match Projection Arrays; Christie Press Release; Jun. 10, 2008; Cypress, CA; 1 page.
BARCO Chosen as Preferred Solutions Provider for Prestigious Discover Magazine Technological Innovation Awards Ceremony; Press Release; http://www.projectorcentral.com; Jun. 9, 2011; 2 pages.
Acuras™ for SIM 6 Ultra II; BARCO; Mar. 2007; 2 pages.

* cited by examiner

*Primary Examiner* — Sultan Chowdhury
*Assistant Examiner* — Danell L Owens
(74) *Attorney, Agent, or Firm* — Armstrong Teasdale LLP (57) ABSTRACT

A method for setting an output of a projector of a display system, is provided. The method includes displaying an image on a projector screen using the projector, measuring a light characteristic emanating from the projector screen using a first meter on a first side of the projector screen, adjusting the output of the projector until a desired value of the light characteristic is measured at the first meter, measuring the light characteristic of light emitted from the projector, with a second meter on a second side of the projector screen, to obtain a light characteristic measurement that corresponds to the desired value, and storing the light characteristic measurement that corresponds to the desired value.

20 Claims, 5 Drawing Sheets

SYSTEMS AND METHODS FOR CALIBRATING AND ALIGNING DISPLAYS

BACKGROUND

The field of the disclosure relates generally to projection displays, and more specifically, to calibrating and aligning such displays.

Many display systems use one or more projectors and/or projection screens to generate images. Such display systems may be used for flight and/or motion simulators, television displays, and educational and/or business presentations. Over time, one or more components of the displays systems may require realignment. Accordingly, to properly display images, projectors may be periodically realigned to adjust one or more characteristics of the light emitted from the projectors. For example, the projectors may be re-aligned to adjust a luminosity and/or chromaticity of the light.

In at least some display systems the projector screen is located between the design eye (i.e., the location at which a user views the displayed images) and the projector. To measure a light characteristic of the light generated by the projector, a portable, remote meter can be used at the design eye to measure characteristics of the light as displayed on the projector screen. Accordingly, to align the projector for a desired light characteristic as viewed from the design eye, in at least some known display systems, the meter must be used to measure characteristics of light at the design eye for each realignment. Measuring light characteristics at the design eye with a remote meter every time the display system is to be realigned is time-consuming as it may require installation and alignment of remote meter before display alignment, and it may only align one projector at a time. Further, the remote meter obstructs the image and may prohibit a user from viewing images on the screen while the measurements are being taken.

BRIEF DESCRIPTION

In one aspect, a method for setting an output of a projector of a display system, is provided. The method includes displaying an image on a projector screen using the projector, measuring a light characteristic emanating from the projector screen using a first meter on a first side of the projector screen, adjusting the output of the projector until a desired value of the light characteristic is measured at the first meter, measuring the light characteristic of light emitted from the projector, with a second meter on a second side of the projector screen, to obtain a light characteristic measurement that corresponds to the desired value, and storing the light characteristic measurement that corresponds to the desired value.

In another aspect, a system for setting an output of a projector of a display system is provided. The system includes a projector screen, a projector configured to display an image on the projector screen by emitting light, a first meter on a first side of the projector screen, the first meter configured to measure a light characteristic emanating from the projector screen, a second meter on a second side of the projector screen, the second meter configured to measure the light characteristic of light emitted from the projector; and a processing device coupled to the first meter, the second meter, and the projector. The processing device is configured to adjust the output of the projector until a desired value of the light characteristic is measured at the first meter, measure the light characteristic, with the second meter, to obtain a light characteristic measurement that corresponds to the desired value, and store the light characteristic measurement that corresponds to the desired value.

In yet another aspect, one or more computer-readable storage media having computer-executable instructions embodied thereon are provided. When executed by at least one processor, the computer-executable instructions cause the at least one processor to receive a measurement of a light characteristic emanating from a projector screen using a first meter on a first side of a projector screen, adjust an output of the projector until a desired value of the light characteristic is measured at the first meter, measure the light characteristic of light emitted from a projector, with a second meter on a second side of the projector screen, to obtain a light characteristic measurement that corresponds to the desired value, and store the light characteristic measurement that corresponds to the desired value.

The features, functions, and advantages that have been discussed can be achieved independently in various embodiments or may be combined in yet other embodiments, further details of which can be seen with reference to the following description and drawings.

DETAILED DESCRIPTION

The methods and systems described herein facilitate alignment and calibration of a display system. A first meter is located at a design eye position of the display system, and a second meter is located between a projector and a projector screen of the system. By performing a baseline calibration with the first meter, a relationship between measurements of one or more light characteristics at the first meter and the second meter can be determined. The measured characteristics may include, for example, luminosity and/or chromaticity. Based on the determined relationship, the display system can be realigned without taking further measurements at the design eye. Further, display systems including multiple projector screens can be quickly and easily realigned after the baseline calibration is performed, such that all of the projector screens have a uniform luminosity and/or chromaticity.

Figure 1:
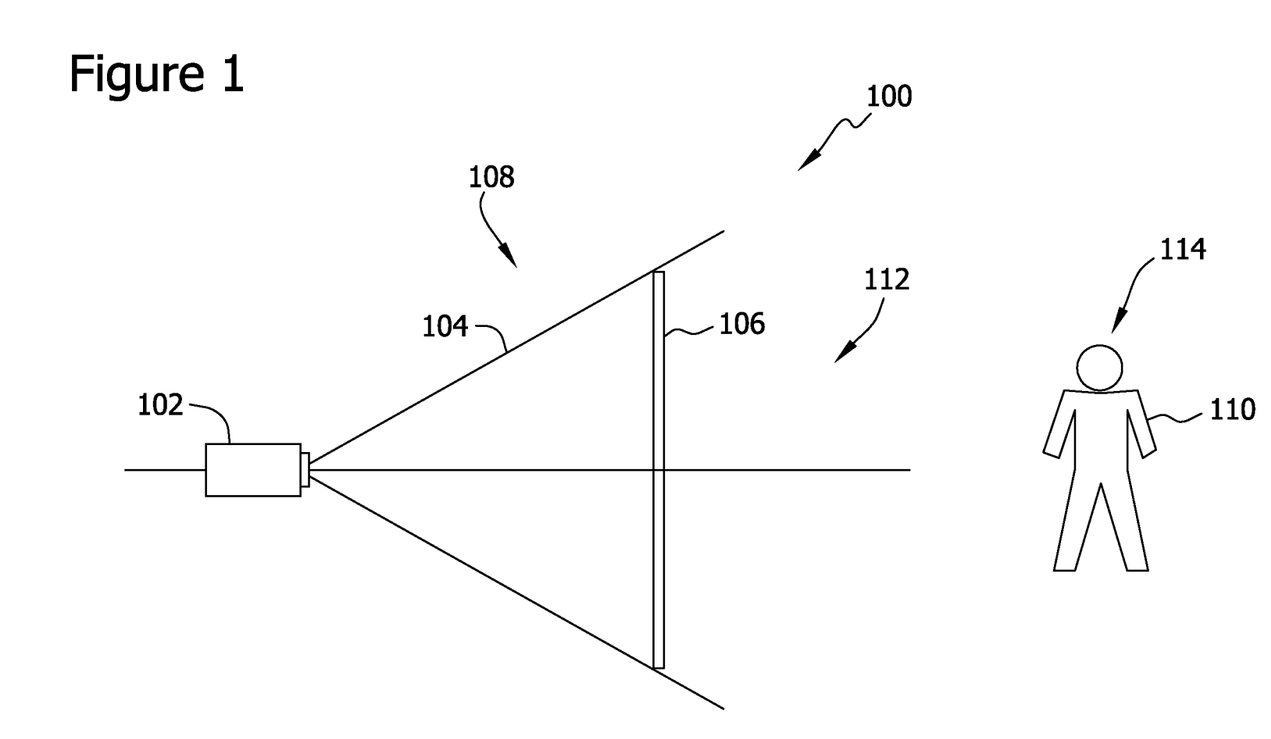
FIG. 1 is a diagram of an exemplary display system.

FIG. 1 is a diagram of an exemplary display system 100. Display system 100 includes a projector 102 that emits a light cone 104. By emitting light cone 104 towards a projector screen 106, images are generated on projector screen 106. In the exemplary embodiment, projector 102 is positioned on a projection side 108 of display system 100, and a user 110 views the images generated on projector screen 106 from a viewing side 112 of display system 100. More specifically, user 110 views projector screen 106 at a design eye position 114 of display system 100. Design eye position 114 is the position at which user 110 has an optimal view of projector screen 106. In the one application, design eye position 114 is located approximately one meter from projector screen 106.

Alternatively, design eye position 114 may be located anywhere that enables display system 100 to function as described herein.

In the exemplary embodiment, projector 102 is a digital projector. Projector 102 may have any resolution that enables display system 100 to function as described herein. For example, projector 102 may be capable of displaying images on projector screen 106 at a resolution of 800×600 pixels, 1024×768 pixels, 1280×720 pixels, and/or 1920×1080 pixels. Further, projector 102 may have any light output that enables display system 100 to function as described herein. In the exemplary embodiment, projector 102 has a light output from 1500 lumens (lm) to greater than 4000 lm. While in the exemplary embodiment, display system 100 is a back projection system, in which projector 102 and user 110 are located on opposite sides of projector screen 106, the methods and systems described herein may also be used with a front projection system, in which projector 102 and user 110 are located on the same side of projector screen 106.

While in the exemplary embodiment, only one projector 102 and one projector screen 106 are shown, display system 100 may include any number of projectors and/or projector screens. For example, in one embodiment, display system 100 forms part of a multi-facet (i.e., multi-screen) flight and/or motion simulator. In such an embodiment, display system 100 includes an array of projector screens and/or projectors that generate images to simulate, for example, the out-the-window view from a cockpit of an aircraft (not shown). Accordingly, the methods and systems described herein can be utilized to calibrate and/or align an array of projectors and/or projector screens.

Figure 2:
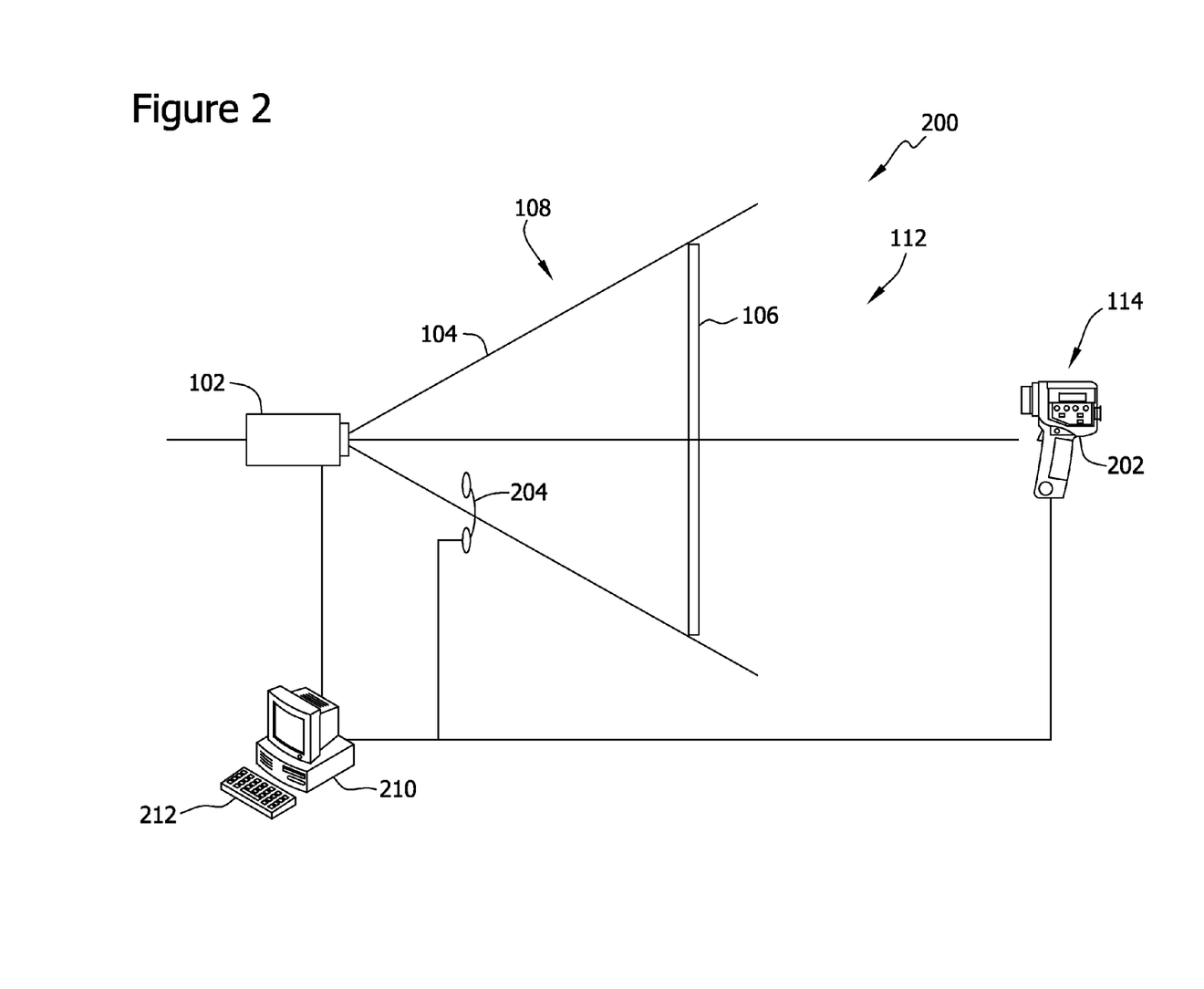
FIG. 2 is a diagram of a system that may be used to calibrate and align the display system shown in FIG. 1.

FIG. 2 is a diagram of an exemplary system 200 for calibrating and aligning display system 100 (shown in FIG. 1). Unless otherwise specified, the same reference numerals used in FIG. 1 are used in FIG. 2 to identify like elements. To align and calibrate display system 100, system 200 includes a first meter 202 and a second meter 204. In the exemplary embodiment, first meter 202 is an incident light meter. First meter 202 measures the luminance and/or chromaticity of light incident on first meter 202. Second meter 204 is also an incident light meter in the exemplary embodiment. Similar to first meter 202, second meter 204 measures the illuminance and/or chromaticity of incident light. Alternatively, first meter 202 and second meter 204 are any light-measuring devices capable of measuring any characteristics of light that enable system 200 to function as described herein.

In the exemplary embodiment, first meter 202 is positioned on viewing side 112 of projector screen 106. More specifically, first meter 202 is positioned at design eye position 114, and measures one or more characteristics of light (e.g., luminance and/or chromaticity) in images displayed on projector screen 106. In the exemplary embodiment, first meter 202 is portable, such that first meter 202 can be used to quickly and easily measure light characteristics for a plurality of projector screens 106 and/or projectors 102. Further, first meter 202 may be operated by an operator, such as user 110. Further, as first meter 202 is portable, it can be quickly and easily removed from design eye position 114 when display system 100 is in normal operation and user 110 is located at design eye position 114.

Second meter 204 is positioned on projection side 108 of projector screen 106 in the exemplary embodiment. More specifically, second meter 204 is located between projector 102 and projector screen 106 such that second meter 204 measures one or more characteristics of light (e.g., illuminance and/or chromaticity) in light cone 104. Second meter 204 is relatively fixed with respect to projector 102 and projector screen 106. In some embodiments, second meter 204 is coupled to a servomechanism and/or mechanical arm (not shown) that enables second meter 204 to move to different positions within light cone 104 and into and out of light cone 104. Further, in embodiments where display system 100 includes a plurality of projectors 102 and/or projector screens 106, system 100 includes a servomechanism and associated second meter 204 for each projector 102. In such an embodiment, the plurality of second meters 204 may be coupled to a single processing device (described below).

While in the exemplary embodiment, display system 100 is a back projection system, in which first meter 202 and second meter 204 of system 200 are located on opposite sides of projector screen 106, alternatively, the methods and systems described herein may be used with a front projection system (not shown). In a front projection system, first meter 202 and second meter 204 are located on the same side of projector screen 106.

Second meter 204 can detect changes in one or more characteristics of light as the light is emitted from projector 102 in light cone 104. However, as second meter 204 is located between projector 102 and projector screen 106, second meter 204 is unable to detect changes in one or more characteristics of light in the image projected on projector screen 106 (i.e., changes due to projector screen 106 and not projector 102).

In the exemplary embodiment, projector 102, first meter 202, and second meter 204 are each connected to a processing device 210. Processing device 210 may also be connected to an image generator (not shown) that generates images to be projected by projector 102 onto projector screen 106. The generated images may include test patterns for aligning and/or calibrating display system 100. Processing device 210 enables calibration and alignment of display system 100, as described in detail below. Further, in some embodiments, processing device 210 controls the servomechanism and/or mechanical arm attached to second meter 204, such that processing device 210 can move second meter 204 in and out of light cone 104 or within light cone 104 as desired.

System 200 performs a baseline calibration of display system 100. In the exemplary embodiment, the baseline calibration of display system 100 is performed periodically, for example, once a month. Alternatively, the baseline calibration may be performed with any frequency that enables system 200 to function as described herein. To perform the baseline calibration, first meter 202 measures a light characteristic in an image on projector screen 106. While in the exemplary embodiment, one characteristic is measured, any number of characteristics may be measured that enable system 200 to function as described herein.

An output of projector 102 is adjusted until a desired value of the characteristic is measured at first meter 202. When first meter 202 measures the desired value for the characteristic, the processing device 210 receives and stores the measured characteristic from first meter 202. For example, in one embodiment, processing device 210 stores a luminance of the light on projector screen 106 as measured by first meter 202. In another embodiment, processing device 210 stores a chromaticity of the light on projector screen 106 as measured by first meter 202. Similarly, when first meter 202 measures a desired value of the characteristic on projector screen 106, second meter 204 measures a corresponding value of the light characteristic in light cone 104. Processing device 210 also receives and stores the measured light characteristic from second meter 204.

Given the measured characteristics from first meter 202 and second meter 204, processing device 210 correlates and/ or maps the light characteristic measurements to one another. That is, processing device 210 determines a relationship between the measured characteristic from first meter 202 and the measured characteristic from second meter 204. For example, in general, a luminosity of light on projector screen 106 as measured by first meter 202 will be linearly related to a luminosity of light cone 104 measured by second meter 204. That is, luminosity measured by first meter 202 is directly proportional to luminosity measured by second meter 204 by some constant. Given the two measured luminosities, the constant, and accordingly, the relationship between the two measurements, is determined by processing device 210.

In another example, the relationship between the chromaticity of light on projector screen 106 as measured by first meter 202 and the chromaticity of light in light cone 104 as measured by second meter 204 is determined. While luminosity and chromaticity are discussed specifically, processing device may determine the relationship between measurements at first meter 202 and second meter 204 for any light characteristic that enables system 200 to function as described herein.

Once processing device 210 determines the relationship between a measurement at first meter 202 and a measurement at second meter 204 for a given light characteristic, processing device 210 stores the relationship. With the relationship known, display system 100 is now calibrated, and can be realigned without requiring further measurements from first meter 202. More specifically, to maintain alignment and/or automatically realign display system 100, processing device 210 can determine whether the characteristic has the desired value at design eye 114 by measuring the characteristic at second meter 204. Additionally, using the determined relationship, processing device 210 can adjust the output of projector 102 to a new value for the given light characteristic, as described herein.

For example, suppose the luminosity of projector screen 106 should be set at one hundred candelas per square meter (cd/m$^2$) as viewed from design eye position 114 (i.e., the position of user 110 during normal operation of display system 100). To realign projector 102 without determining the relationship between a luminosity measured at first meter 202 and a luminosity measured at second meter 204, the luminosity is measured at first meter 202. Depending on whether the measured luminosity at first meter 202 is higher or lower than expected, projector 102 is adjusted accordingly, and first meter 202 again measures the luminosity. This trial and error process is repeated until the luminosity reaches the desired one hundred cd/m$^2$ as measured by first meter 202 at design eye position 114. Without determining a relationship between the first meter measurement and the second meter measurement, this process must be repeated for each realignment.

However, for the previous example, suppose the relationship between a luminosity measured at first meter 202 and a luminosity measured at second meter 204 is determined by processing device 210 as part of a baseline calibration. As a result, for realignments, no further measurements need to be taken using first meter 202. For example, suppose processing device 210 determines that a luminance measured by first meter 202 is twice that of an illuminance measured by second meter 204. Accordingly, instead of measuring luminance with first meter 202 until the desired luminance is reached, processing device 210 simply adjusts the luminosity of projector 102 until the luminosity measured by second meter 204 is fifty cd/m$^2$, corresponding to one hundred cd/m$^2$ as viewed from design eye position 114.

In display systems 100 that include an array of projector screens 106, the relationship between a light characteristic as measured by first meter 202 and the light characteristic as measured by second meter 204 may be unique for each projector screen 106. Accordingly, processing device 210 determines and stores the relationship for each projector screen 106 during the baseline calibration, and the entire array of projector screens 106 can be realigned using the methods described herein without any further measurements from first meter 202.

For example, in one embodiment, system 200 aligns an array of projector screens 106 to a desired luminosity. Over time, the output of projectors 102 may decrease substantially. Accordingly, using system 200, a maximum luminance for each projector 102 is determined with second meter 204. Once the maximum luminance of each projector 102 is known, a target luminance on projector screens 106 that all projectors 102 can achieve is determined. The target luminance is calculated using the relationship between luminance measurements at first meter 202 and second meter 204. Once the target luminance for projector screens 106 is determined, projectors 102 are aligned accordingly to display images at the target luminance on each projector screen 106. Thus, in display systems having an array of projector screens 106, projectors 102 can be quickly aligned such that a uniform luminosity is displayed on projector screens 106, taking into account any decrease in output of projectors 102.

In the exemplary embodiment, processing device 210 includes a user input device 212. User input device 212 may include, for example, a keyboard, a pointing device, a mouse, a stylus, a touch sensitive panel (e.g., a touch pad or a touch screen), a gyroscope, an accelerometer, a position detector, and/or an audio user input interface. For different modes of operation of display system 100, different values of light characteristics may be desired. Accordingly, using input device 212, an operator, for example, user 110, can input one or more realignment parameters (e.g., luminance, chromaticity, etc.) for display system 100. That is, a user can specify new values for the characteristic. For example, to optimize the alignment of projectors for dark or bright images, a user may specify a video intensity for projector 102 to be aligned to.

Based on the input realignment parameters, processing device 210 controls and/or adjusts projector 102 using the methods described herein to realign display system 100. Alternatively, processing device 210 may store realignment parameters for different modes of operation, and the operator may simply select the desired mode of operation. Upon receiving the selected mode of operation, processing device 210 retrieves the corresponding realignment parameters and adjusts projector 102 accordingly.

Further, in the exemplary embodiment, system 200 automatically realigns display system 100. That is, processing device 210 may periodically move second meter 204 into light cone 104, measure a characteristic of light cone 104, and, based on the measured characteristic and the relationship determined during the baseline calibration, adjust projector 102 accordingly to maintain a desired alignment. In one embodiment, processing device 210 automatically realigns display system 100 on a periodic basis, for example, daily. Generally, processing device 210 performs automatic realignment of display system 100 more often than the baseline calibration is performed. Alternatively, automatic realignment is performed with any frequency that enables system 200 to function as described. For the automatic realignment, no measurements from first meter 202 are required.

To automatically realign display system 100, processing device 210 determines whether the characteristic has the desired value at design eye 114 by measuring the characteristic at second meter 204. More specifically, if the measurement of the characteristic at second meter 204 is equal to the corresponding value, system 100 is properly aligned. If the measurement of the characteristic at second meter 204 is not equal to the corresponding value, system 100 is not properly aligned, and the output of projector 102 is adjusted until the corresponding value is measured at second meter 204.

Figure 3:
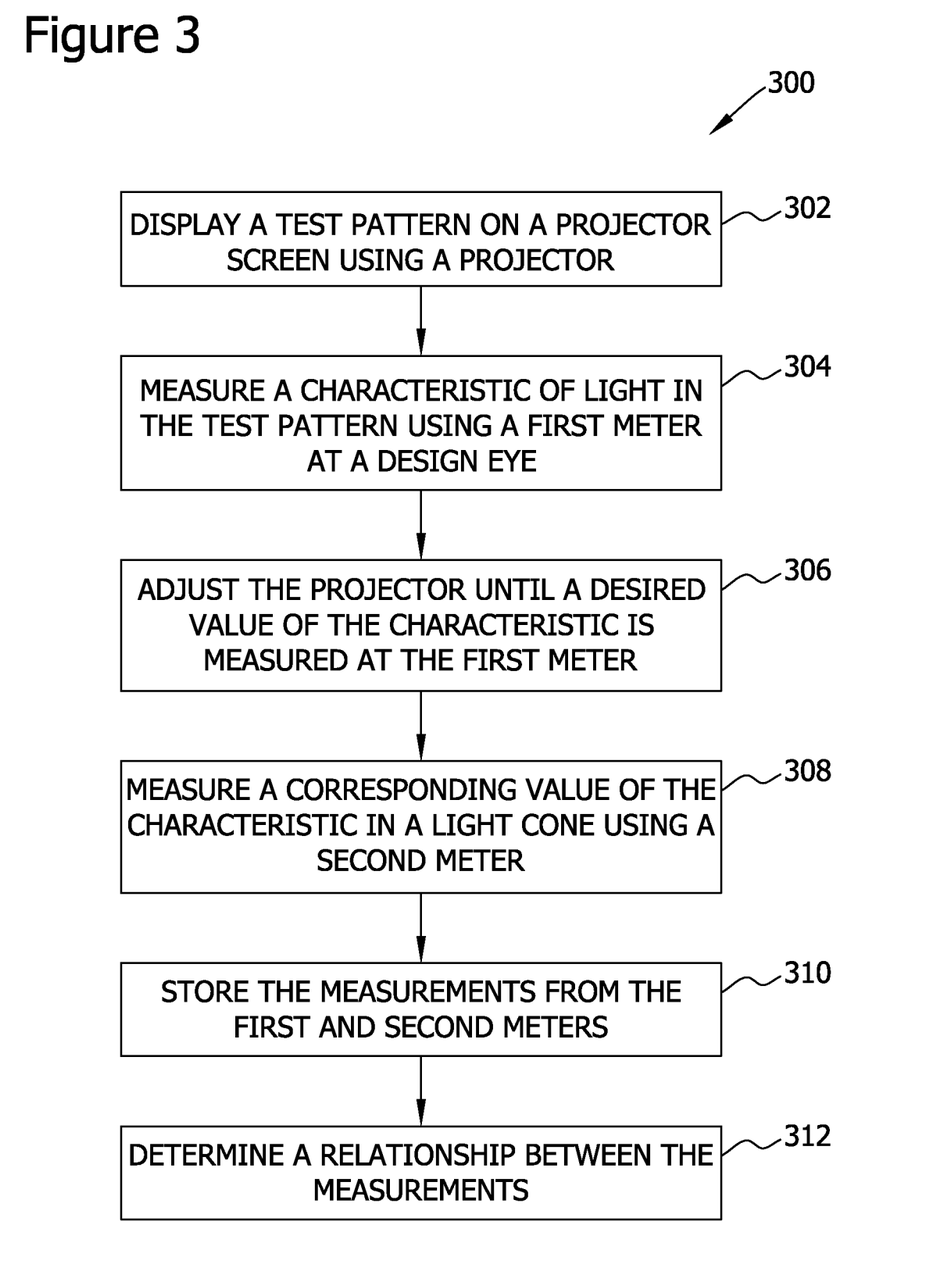
FIG. 3 is a flowchart of an exemplary method of performing a baseline calibration that may be implemented using the system shown in FIG. 2.

FIG. 3 is a flowchart of an exemplary method 300 of performing a baseline calibration of a display system, such as display system 100. A projector, such as projector 102 displays 302 a test pattern on a projector screen, such as projector screen 106. Depending on the light characteristic to be calibrated, the test pattern may include, for example, a white field test pattern for luminosity or a color test pattern for chromaticity. Further, in some embodiments, a white field test pattern including different intensities of white and/or grey light may be used to achieve a desired color temperature for chromaticity. In one embodiment, a processing device coupled to projector, such as processing device 210, instructs the projector to display the test pattern. At least one light characteristic in the test pattern is measured 304 using a first meter at the design eye, such as first meter 202. For example, the luminance and/or chromaticity of the test pattern may be measured.

The output of the projector 102 is adjusted 306 until a desired value of the characteristic is measured at the first meter. Once the desired value is measured at the first meter, a corresponding value of the characteristic is measured 308 at a second meter located in a light cone between the projector and the projector display, such as meter 204 and light cone 104. The measurements at the first meter and the second meter are stored 310 on the processing device. The processing device determines 312 a relationship between the two measurements for future alignment using the methods described herein. Accordingly, to determine whether the characteristic has the desired value at the design eye, the characteristic is simply measured at the second meter to determine whether it is equal to the corresponding value. In display systems with a plurality of screens, this baseline calibration process may be performed for each screen individually.

Figure 4:
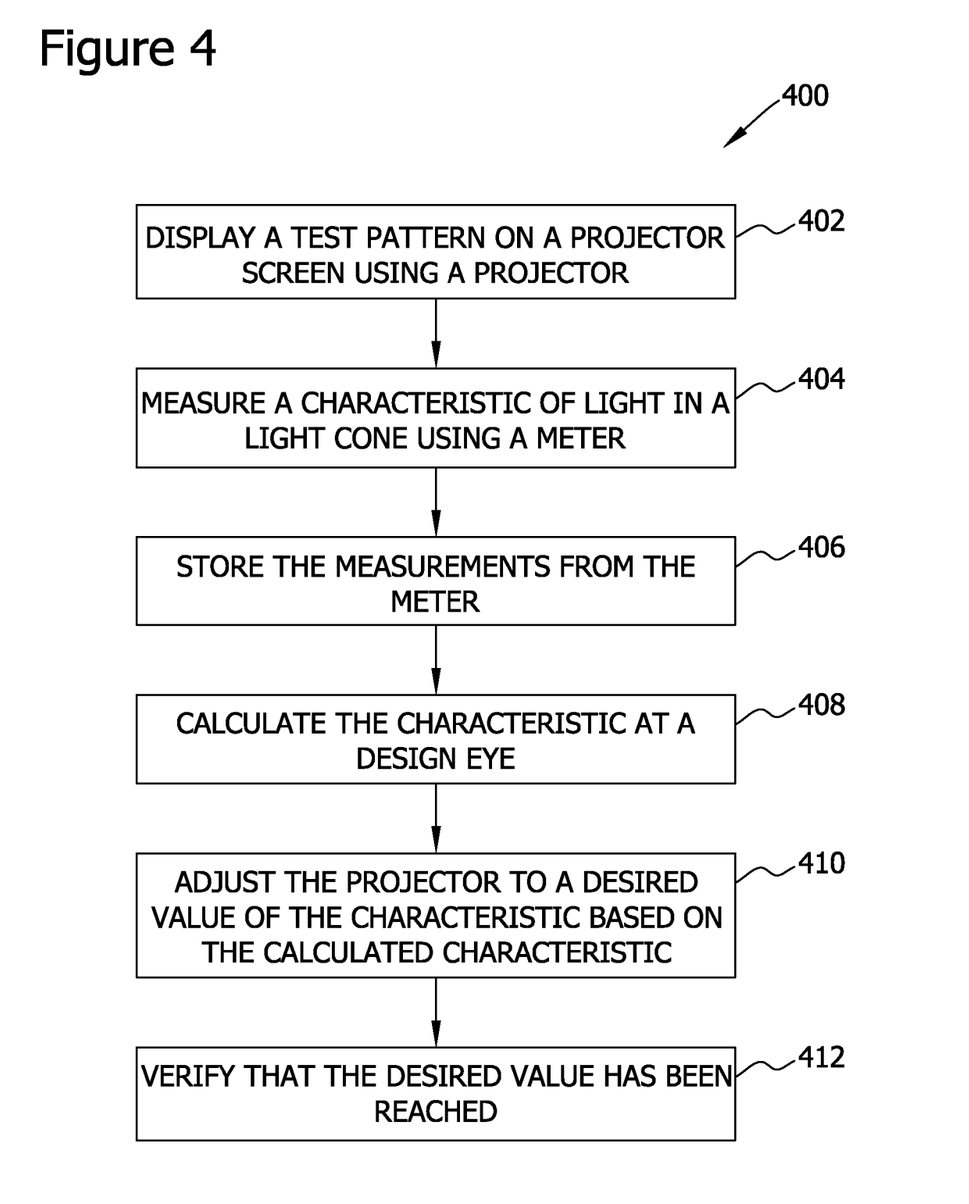
FIG. 4 is a flowchart of an exemplary method of performing an automatic realignment that may be implemented using the system shown in FIG. 2.

FIG. 4 is a flowchart of an exemplary method 400 of performing an automatic realignment of a display system, such as display system 100. When performing the automatic realignment, the relationship between a light characteristic measured at a first meter, such as first meter 202, and a second meter, such as second meter 204, has already been determined. A projector, such as projector 102 displays 402 a test pattern on a projector screen, such as projector screen 106. Depending on the particular light characteristic to be realigned, the test pattern may be, for example, a white field test pattern for luminosity or a color test pattern for chromaticity. The light characteristic is measured 404 using the meter located in a light cone between the projector and the projector screen, such as second meter 204.

A processing device coupled to the projector, such as processing device 210, stores 406 the measured characteristic and calculates 408 the light characteristic at the design eye position of the display system based on the determined relationship between measurements of the characteristic at the first meter and at the second meter. If the processing device determines the system is not properly aligned (i.e., the calculated light characteristic is not at the desired value), the processing device adjusts 410 the projector accordingly. Once the projector is adjusted such that the calculated light characteristic reaches the desired value, the meter located in the light cone measures the light characteristic and the processing device calculates the characteristic at the design eye position to verify 412 that the display system is properly aligned with respect to the light characteristic.

Figure 5:
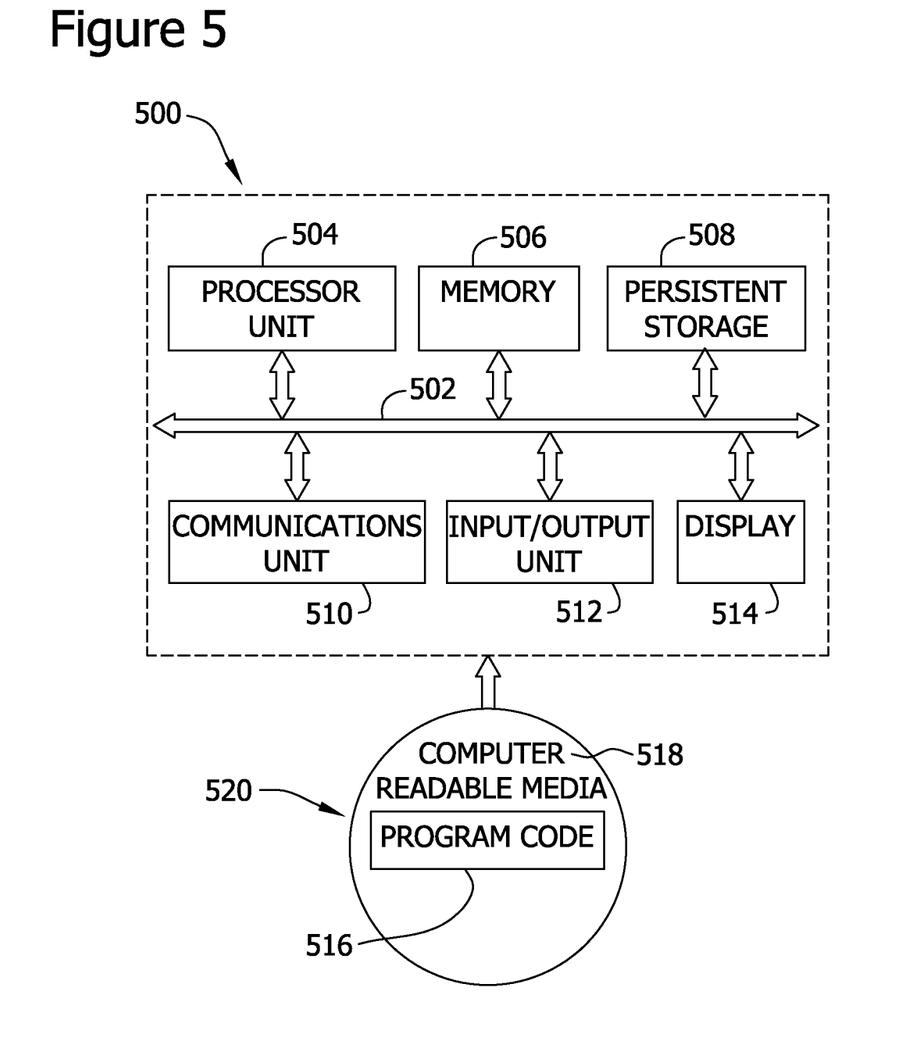
FIG. 5 is a diagram of an exemplary data processing system.

FIG. 5 is a diagram of an exemplary data processing system 500 that may be used in implementing one or more of the embodiments described herein. For example, processing device 210 may be implemented using data processing system 500. In the exemplary embodiment, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, without limitation, a random access memory or any other suitable volatile or non-volatile storage device. Persistent storage 508 may take various forms depending on the particular implementation. For example, without limitation, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, without limitation, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communication links.

Input/output unit 512 allows for input and output of data with other devices that may be connected to data processing system 500. For example, without limitation, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508. In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 516 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 516 may be a server computer, a client computer, or some other device capable of storing and transmitting program code 516.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 506 or a cache such as that found in an interface and memory controller hub that may be present in communications fabric 502.

The embodiments described herein facilitate alignment and calibration of a display system. A first meter is located at a design eye position of the display system, and a second meter is located between a projector and a projector screen of the system. By performing a baseline calibration with the first meter, a relationship between measurements of one or more light characteristics at the first meter and the second meter can be determined. The measured characteristics may include, for example, luminosity and/or chromaticity. Based on the determined relationship, the display system can be realigned without taking further measurements at the design eye. Further, display systems including multiple projector screens can be quickly and easily realigned after the baseline calibration is performed, such that all of the projector screens have a uniform luminosity and/or chromaticity.

The methods and systems described herein may be encoded as executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for setting an output of a projector of a display system, the method comprising:
    displaying an image on a projector screen using the projector;
    measuring a light characteristic of light emanating from the projector screen using a first meter on a first side of the projector screen to identify a first value of the light characteristic, wherein the first side is a viewing side of the projection screen;
    adjusting the output of the projector to modify the light emanating from the projector screen until the first meter identifies a second value of the light characteristic that is substantially equal to a predetermined desired value of the light characteristic;
    positioning a second meter on a second side of the projection screen such that the second meter is positioned directly within a light cone emitted by the projector, wherein the second side is a projection side of the projection screen, and wherein the projector is positioned on the second side;
    measuring the light characteristic of light emitted from the projector, with the second meter on the second side of the projector screen, to identify a third value of the light characteristic, wherein the third value corresponds to the second value; and
    determining a relationship between the second value of the light characteristic and the third value of the light characteristic.

2. The method in accordance with claim 1, further comprising:
    obtaining the light characteristic measurement using the second meter;
    adjusting the output of the projector based on the obtained light characteristic measurement; and
    repeating said obtaining and said adjusting steps until the obtained light characteristic measurement is equal to the third value of the light characteristic that corresponds to the desired value, such that the desired value of the light characteristic is attained at a former position of the first meter.

3. The method in accordance with claim 1, further comprising:
receiving, at a processing device coupled to the projector, a user input including a new desired value of the light characteristic to be found at a former position of the first meter;
calculating, based on the determined relationship, a fourth value of the light characteristic at the second meter that corresponds to the new desired value;
obtaining a measurement of the light characteristic to identify a fifth value of the light characteristic using the second meter;
adjusting the output of the projector based on the obtained fifth value of the light characteristic; and
repeating said obtaining and said adjusting steps until the obtained fifth value of the light characteristic is equal to the fourth value of the light characteristic that corresponds to the new desired value, such that the new desired value of the light characteristic is attained at the former position of the first meter.

4. The method in accordance with claim 1, wherein determining a relationship comprises determining a linear relationship between the second value and the third value.

5. The method in accordance with claim 1, wherein measuring a light characteristic comprises measuring a luminosity of the light.

6. The method in accordance with claim 1, wherein measuring a light characteristic comprises measuring a chromaticity of the light.

7. The method in accordance with claim 1, wherein measuring the light characteristic using a first meter comprises measuring the light characteristic at a design eye of the display system.

8. The method in accordance with claim 1, wherein measuring the light characteristic with the second meter comprises measuring the light characteristic in the light cone emitted from the projector at a position between the projector and the projector screen.

9. The method in accordance with claim 1, wherein displaying an image comprises displaying at least one of a white field test pattern and a color test pattern.

10. A system for setting an output of a projector of a display system, the system comprising:
a projector screen;
a projector configured to display an image on said projector screen by emitting light;
a first meter on a first side of said projector screen, wherein said first side is a viewing side of said projection screen said first meter configured to measure a light characteristic of light emanating from said projector screen;
a second meter on a second side of said projector screen and directly within a light cone emitted by the projector, said second meter configured to measure the light characteristic of light emitted from said projector, wherein said second side is a projection side of said projection screen, and wherein said projector is positioned on said second side; and
a processing device coupled to said first meter, said second meter, and said projector, said processing device configured to:
measure the light characteristic of light emanating from said projector screen to identify a first value of the light characteristic;
adjust the output of said projector to modify the light emanating from said projector screen until said first meter identifies a second value of the light characteristic that is substantially equal to a predetermined desired value of the light characteristic;
measure the light characteristic of light emitted from the projector within the light cone, with said second meter, to identify a third value of the light characteristic, wherein the third value corresponds to the second value; and
determine a relationship between the second value of the light characteristic and the third value of the light characteristic.

11. The system in accordance with claim 10, wherein said processing device is further configured to:
obtain the light characteristic measurement using said second meter;
adjust the output of said projector based on the obtained light characteristic measurement; and
repeat the obtaining and the adjusting until the obtained light characteristic measurement is equal to the third value of the light characteristic that corresponds to the desired value, such that the desired value of the light characteristic is attained at a former position of said first meter.

12. The system in accordance with claim 10, wherein said processing device is further configured to:
receive a user input including a new desired value of the light characteristic to be found at a former position of said first meter;
calculate, based on the determined relationship, a fourth value of the light characteristic at said second meter that corresponds to the new desired value;
obtain a measurement of the light characteristic to identify a fifth value of the light characteristic using said second meter;
adjust the output of said projector based on the obtained fifth value of the light characteristic; and
repeat the obtaining and the adjusting until the obtained fifth value of the light characteristic is equal to the fourth value of the light characteristic that corresponds to the new desired value, such that the new desired value of the light characteristic is attained at the former position of said first meter.

13. The system in accordance with claim 10, wherein said first meter is further configured to measure the light characteristic at a design eye of the display system.

14. The system in accordance with claim 10, wherein said second meter is further configured to measure the light characteristic in the cone of light emitted by said projector at a position between said projector and said projector screen.

15. The system in accordance with claim 10, wherein said first and second meters are configured to measure at least one of a luminosity and a chromaticity of light.

16. One or more non-transitory computer-readable storage media having computer-executable instructions embodied thereon, wherein when executed by at least one processor, the computer-executable instructions cause the at least one processor to:
receive a first value of a light characteristic emanating from a projector screen as measured using a first meter on a first side of the projector screen, wherein the first side is a viewing side of the projection screen;
adjust an output of a projector to modify the light emanating from the projector screen until the first meter identifies a second value of the light characteristic that is substantially equal to a predetermined desired value of the light characteristic;

measure the light characteristic of light emitted from the projector, with a second meter on a second side of the projector screen and positioned within a light cone emitted by the projector, to identify a third value of the light characteristic, wherein the third value corresponds to the second value, wherein the second side is a projection side of the projection screen, and wherein the projector is positioned on the second side; and determine a relationship between the second value of the light characteristic and the third value of the light characteristic.

17. The one or more computer-readable storage media having computer-executable instructions embodied thereon according to claim 16, wherein the instructions further cause the at least one processor to:

obtain a measurement of the light characteristic using the second meter;

adjust the output of the projector based on the obtained light characteristic measurement; and repeat the obtaining and the adjusting until the obtained light characteristic measurement is equal to the third value of the light characteristic that corresponds to the desired value, such that the desired value of the light characteristic is attained at a former position of the first meter.

18. The one or more computer-readable storage media having computer-executable instructions embodied thereon according to claim 16, wherein the instructions further cause the at least one processor to:

receive a user input including a new desired value of the light characteristic to be found at a former position of the first meter;

calculate, based on the determined relationship, a fourth value of the light characteristic at the second meter that corresponds to the new desired value;

obtain a measurement of the light characteristic to identify a fifth value of the light characteristic using the second meter;

adjust the output of the projector based on the obtained fifth value of the light characteristic; and repeat the obtaining and the adjusting until the obtained fifth value of the light characteristic is equal to the fourth value of the light characteristic that corresponds to the new desired value, such that the new desired value of the light characteristic is attained at the former position of the first meter.

19. The one or more computer-readable storage media having computer-executable instructions embodied thereon according to claim 16, wherein the instructions cause the processor to receive a luminosity measurement.

20. The one or more computer-readable storage media having computer-executable instructions embodied thereon according to claim 16, wherein the instructions cause the processor to receive a chromaticity measurement.

* * * * *